United States Patent Office 2,915,523
Patented Dec. 1, 1959

2,915,523

BENZACRIDINE COMPOUNDS

Alexander M. Moore, Grosse Pointe Farms, and Edward F. Elslager and Franklin W. Short, St. Clair Shores, Mich., assignors to Parke, Davis & Company, Detroit, Mich., a corporation of Michigan No Drawing. Application December 3, 1956
Serial No. 625,597

6 Claims. (Cl. 260—279)

This invention relates to new chemical compounds and to methods for producing the same. More particularly, the invention relates to novel benz[c]acridine compounds and acid addition salts thereof which in free base form have the formula

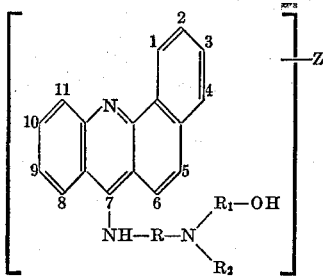

where R is a divalent alkyl radical containing from 2 to 5 carbon atoms inclusive, $R_1$ represents a divalent alkyl radical containing from 2 to 8 carbon atoms inclusive, $R_2$ represents an alkyl or hydroxyalkyl radical containing from 2 to 8 carbon atoms inclusive, or taken together with —$R_1$—OH and —N< represents a saturated heterocyclic ring such as a pyrrolidino or piperidino ring containing a hydroxy, hydroxymethyl or hydroxyethyl substituent, and Z represents a hydrogen, lower alkyl, lower alkoxy or halogen radical.

The compounds of the invention possess useful chemotherapeutic properties, especially as amebicidal agents, being particularly effective in combatting *E. histolytica*. The compounds are also useful as intermediates for the production of amedicidal agents such as are described in copending application Serial No. 395,830, now Patent No. 2,773,064.

The new hydroxy benz[c]acridine compounds occur in the form of the free base having the above formula or as the addition salt of an organic or inorganic acid. In general, the invention contemplates the salts of any relatively nontoxic organic or inorganic acid. Some typical examples of these salts are the hydrochloride, hydrobromide, sulphate, phosphate, oxalate, sulfamate, sulfonate, acetate, lactate, tannate, tartrate, gluconate, citrate, penicillinate, arsanilate, arsonate, fumagillinate and the like. As examples of preferred salts there may be mentioned the 5,5'-methylene disalicylate, 4,4'-methylene bis-(3-hydroxy-2-naphthoate), methylene di-o-cresotinate, 8-hydroxy-7-iodo-5-quinoline sulfonate, N-acetyl - 4 - hydroxy - m - arsanilate, N - glycolyl - p-arsanilate, N,N' - ethylene bis - (p - arsanilate), p-ureidobenzenearsonate, benzylpenicillinate, phenoxymethylpenicillinate, fumagillinate and the like. Certain of these salts are particularly useful in that they possess enhanced amebicidal, and in some cases antibacterial, properties.

In accordance with the invention the benz[c]acridine compounds are produced by condensing an amino alcohol of formula

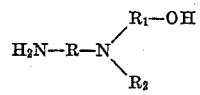

with a 7-substituted benz[c]acridine compound having the formula

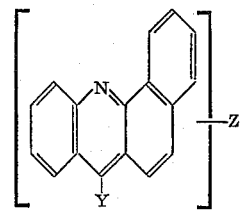

where Y is a halogen, lower alkoxy, phenoxy, lower alkyl mercapto, or aryl mercapto radical and R, $R_1$, $R_2$ and Z have the above-mentioned significance. In carrying out the condensation it will usually be satisfactory to employ substantially equivalent quantities of the reactants. If desired, an excess of either of the reactants may be employed. The use of the amino alcohol in excess is preferred, inasmuch as it serves in most cases as a particularly useful solvent. Although it is ordinarily unnecessary, an anhydrous inert organic solvent such as benzene, toluene, xylene, dioxane, petroleum ether and the like, may be employed. The temperature of the reaction can be varied considerably and is not particularly critical. In general, the reaction is favored by temperatures in excess of 75° C. Preferably, the reaction is carried out in the range from about 75 to 150° C. If desired, the reaction can be carried out under elevated pressure as, for example, in a sealed tube. Condensation catalysts may also be employed. For example, copper salts, copper dust and in particular cuprous chloride can be advantageously employed. In accordance with preferred practice, the reaction is carried out employing a 7-halobenz[c]acridine as a starting material, in the presence of an excess of phenol. In this case, the corresponding phenoxy benz[c]acridine hydrohalide is first formed and the reaction is continued, preferably without isolating the phenoxy benz[c]acridine compound. Further reaction of the phenoxy benz[c]acridine with the amino alcohol gives the desired hydroxy 7-dialkylaminoalkylaminobenz[c]acridine compound.

Another embodiment of the invention comprises condensing a hydroxy amine having the formula

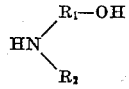

with a 7-haloalkylaminobenz[c]acridine having the formula

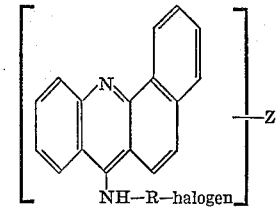

or its salts, where R, $R_1$, $R_2$ and Z have the above-mentioned significance. In carrying out the condensation, substantially equivalent quantities or an excess of either of the reactants may be employed but for reasons of economy as well as ease of purification of the reaction product an excess of the hydroxy amine is preferred. An anhydrous organic solvent such as a hydrocarbon, lower aliphatic alcohol, lower aliphatic ketone, cyclic ketone, tertiary amine or the like, may be employed. As specific examples of such solvents may be mentioned benzene, toluene, xylene, petroleum ether, ethanol, n-propanol, n-butanol, isobutanol, n-pentanol, acetone, diethyl ketone, dioxane, pyridine, etc. An excess of the hydroxy amine may also be employed as a solvent. In general, the reaction is carried out at temperatures between 50 to 100° C.

As indicated above the benz[c]acridine compounds of the invention occur in either the free base or acid salt form. Starting with the salt, the corresponding free base is obtained by dissolving the salt in a suitable solvent such as water, ethanol, etc., and neutralizing the solution with an inorganic or organic base such as sodium hydroxide, ammonium hydroxide, sodium carbonate, potassium carbonate, tertiary organic amines and the like. In some instances it will be desirable to obtain the salt from the free base. This is accomplished by reacting the free base with the corresponding organic or inorganic acid in a suitable solvent. The following specific example serves as an illustration of the method of converting the addition salt of hydrochloric acid to the free base and then converting the free base to the salt of a different acid:

0.5 g. of 2-{[4-(7-benz[c]acridinylamino)pentyl]-ethylamino}ethanol, dihydrochloride, hemihydrate, M.P. 135–140° C., is shaken with 1 ml. of concentrated sodium hydroxide in 9 ml. of water. The free base, 2 - {[4 - (7 - benz[c]acridinylamino)pentyl]ethylamino} ethanol, separates out and is isolated by extraction with chloroform. The combined chloroform extracts are washed with water and dried over anhydrous potassium carbonate. The drying agent is collected by filtration, the chloroform removed in vacuo, and the residue dissolved in ether. If desired the free base can be isolated in pure form by removing the ether in vacuo and crystallizing the residue from an appropriate organic solvent. Upon addition of an alcoholic solution of citric acid to the ether solution of the free base, the yellow citric acid salt of 2 - {[4 - (7 - benz[c]acridinylamino)pentyl]ethylamino}ethanol precipates out. The compound is recovered in pure form by filtration and washing the precipitate with alcohol.

A particularly useful salt is derived from the free base and 8-hydroxy-7-iodo-5-quinolinesulfonic acid by reacting in aqueous solution the dihydrochloride salt of the former with a sodium or potassium salt of the latter. Upon completion of the reaction the desired sulfonic acid salt separates out and is isolated from the reaction mixture.

The following compounds are representative of the various benz[c]acridine compounds which are contemplated by the present invention:

(1) 2 - {methyl[2 - (10 - methyl - 7 - benz[c]acridinyl-amino)-ethyl]amino}ethanol, sulfate.
(2) 4,4' - methylene - bis(3 - hydroxy - 2 - naphthoic acid) salt of 2,2'-[2-(4-methoxy-7-benz[c]acridinyl-amino)ethylimino]diethanol.
(3) 1 - [2 - (7 - benz[c]acridinylamino)ethyl] - 3 - piperidinol, dihydrochloride.
(4) 1 - [4 - (7 - benz[c]acridinylamino)butyl] - 3 - pyrrolidinol, diphosphate.
(5) 1 - [6 - (4 - methoxy - 7 - benz[c]acridinylamino) hexyl]-3-piperidinol, dihydrochloride.
(6) 6 - {[3 - (10 - chloro - 7 - benz[c]acridinylamino)-propyl]-ethylamino}-1-hexanol, dihydrochloride.
(7) 1,1' - [3 - (10 - methyl - 7 - benz[c]acridinylamino)-propylimino]di-2-propanol, dihydrobromide.
(8) 1 - [3 - ( 7 - benz[c]acridinylamino)propyl] - 2-piperidineethanol.
(9) 2 - {[3 - (10 - chloro - 7 - benz[c]acridinylamino) propyl]-octylamino}ethanol, dihydrochloride.
(10) 1 - [5 - (7 - benz[c]acridinylamino)pentyl] - 3-piperidinol, bispenicillin G salt.
(11) 1,1' - [3 - (7 - benz[c]acridinylamino)propyl-imino]-bis[2-methyl-2-propanol], dicitrate.
(12) 1 - [3 - (7 - benz[c]acridinylamino)propyl] - 2,2, 6-trimethyl-4-piperidinol, dihydrochloride.
(13) 2,2' - [4 - (7 - benz[c]acridinylamino)pentyl-imino]-diethanol, dihydrochloride.
(14) 2 - {[3 - (7 - benz [c]acridinylamino)propyl]decyl-amino}ethanol, dihydrochloride.
(15) 2 - {[3 - (10 - chloro - 7 - benz[c]acridinylamino)-propyl]-8-hydroxyoctylamino}ethanol, dihydrochloride.
(16) 1 - [5 - (5 - methoxy - 7 - benz[c]acridinylamino) amyl]-2-piperidinemethanol, diacetate.
(17) 2 - {[4 - (7 - benz[c]acridinylamino)butyl]ethyl-amino}ethanol, bispenicillin G salt.
(18) 2,2' - [5 - (7 - benz[c]acridinylamino)pentylim-ino]-diethanol, dihydrochloride.
(19) 1 - [3 - (10 - chloro - 7 - benz[c]acridinylamino) propyl]-4-piperidinemethanol, dihydrochloride.
(20) 2 - {butyl[3 - (2 - methoxy - 7 - benz[c]acridinyl-amino)propyl]amino}ethanol, bis(N - glycolyl - p - arsanilic acid) salt.
(21) 2 - {[4 - (7 - benz[c]acridinylamino)pentyl],-butylamino}ethanol, dihydrochloride.
(22) 3 - {[3 - (7 - benz[c]acridinylamino)propyl]-methylamino}-1-propanol, bis-(N-acetyl-4-hydroxy-m arsanilic acid ) salt.

*Example 1*

(a) A mixture of 10 g. of 7-chlorobenz[c]acridine and 40 g. of phenol is stirred and heated on a steam bath for fifteen minutes, and 7.9 g. of 2-[(3-aminopropyl) pentylamino]-ethanol is then added. After heating for two hours the mixture is cooled and poured into a solution of 10 ml. of concentrated hydrochloric acid in 125 ml. of acetone. After chilling, the desired product, 2-{[3 - (7 - benz[c]acridinylamino)propyl]pentylamino} ethanol, dihydrochloride, precipitates and is collected by filtration. After recrystallization from an ethanol-ethyl acetate mixture, the hygroscopic yellow powder, of formula,

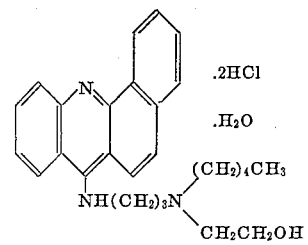

is obtained as the monohydrate, M.P. 150° C.

(b) A mixture of 32.1 g. of 7-phenoxybenz[c]acridine, 18.8 g. of 2-[(3-aminopropyl)pentylamino]ethanol and 150 ml. of pyridine is stirred and heated at 100° for five hours. Upon cooling, the mixture is made alkaline with potassium hydroxide solution and steam-distilled to remove volatile materials. The residue is extracted with chloroform, the combined chloroform extracts washed with water and dried over anhydrous potassium carbonate. Ether is added to the dry chloroform solution, and the mixture is treated with anhydrous hydrogen chloride. The yellow precipitate which separates is collected by filtration, dried in vacuo at 45° C., and crystallized from an ethanol-ethyl acetate mixture to give the desired 2 - {[3 - (7 - benz[c]acridinylamino)propyl]pentyl-amino}ethanol, dihydrochloride, monohydrate, M.P. 149° C.

2-[(3-aminopropyl)pentylamino]ethanol, employed as a starting material for the above procedures, may be prepared as follows: 52.6 g. of 2-pentylaminoethanol is cooled below 30° C. and treated dropwise with 29 ml. of acrylonitrile over a period of seven minutes, with stirring. The reaction mixture is stirred for two hours at room temperature, heated to 80° C. on a water bath for one hour and allowed to stand at room temperature for eighteen hours. The excess acrylonitrile is removed in vacuo, and the residue hydrogenated at 120° C. and 1000 p.s.i.g. in 300 ml. of ethanol saturated with ammonia, over Raney nickel catalyst. Fractional distillation in vacuo of the resulting mixture yields the desired 2-[(3-aminopropylamino)pentylamino]ethanol as a colorless liquid, B.P. 162–165° C./16 mm., $n_D^{28}$ 1.4664.

*Example 2*

(a) A mixture of 10 g. of 7-chlorobenz[c]acridine and 40 g. of phenol is stirred and heated on the steam bath for fifteen minutes and 6.8 g. of 2,2'-(3-aminopropylimino)-diethanol is subsequently added. After heating for two hours on the steam bath, the mixture is cooled to 50° C. and poured into a stirred solution of 10 ml. of concentrated hydrochloric acid in 125 ml. of acetone. After chilling, the precipitated material is collected by filtration. The desired product, 2,2'-[3-(7-benz[c]acridinylamino)propylimino]diethanol, dihydrochloride, is crystallized from methanol. This product has the formula

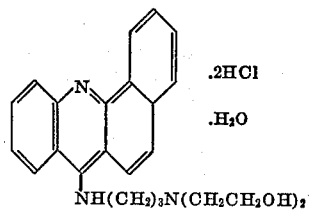

In monohydrate form, the product melts at 228–232° C.

(b) A mixture of 14.5 g. of 7-ethylmercaptobenz[c]acridine, 8.1 g. of 2,2'-(3-aminopropylimino)diethanol and 150 g. of phenol is stirred and heated on the steam bath for three hours. The mixture is cooled and slowly poured into a solution of 20 ml. of concentrated hydrochloric acid in 500 ml. of acetone. Upon cooling in an ice bath, the precipitate is collected by filtration and dried in vacuo at 45° for ten hours. Crystallization of the crude product from methanol gives the desired 2,2'-[3-(7-benz[c]acridinylamino)propylimino]diethanol, dihydrochloride, monohydrate, M.P. 227–230° C.

7-ethylmercaptobenz[c]acridine, employed as a starting material for (b) above, can be prepared in the following manner: a solution of 6.2 g. of ethanethiol in 50 ml. of absolute ethanol is slowly added to a solution of 2.3 g. of sodium in 100 ml. of absolute ethanol. The mixture is stirred for two hours at room temperature, 26.4 g. of 7-chlorobenz[c]acridine is added, and the mixture is refluxed for sixteen hours. The mixture is filtered while hot, the filtrate treated with decolorizing charcoal, heated to boiling and hot water is added until the solution becomes cloudy. On cooling, 7-ethylmercaptobenz[c]acridine separates and is collected and purified from a mixture of acetone and water.

2,2'-(3-aminopropylimino)diethanol, employed as a starting material in the above procedures, can be prepared from diethanolamine and acrylonitrile in accordance with the method set forth under Example 1 herein for the preparation of 2-[(3-aminopropyl)pentylamino]-ethanol.

*Example 3*

A hot solution of 3.9 g. of 2,2'-[3-(7-benz[c]acridinylamino)propylimino]diethanol in 50 ml. of methanol is added to a hot solution of 6.2 g. of N-glycolyl-p-arsanilic acid (contains 12.5% water) in 160 ml. of 75% methanol. The mixture is heated on the steam bath for ten minutes, filtered hot, and the methanol removed in vacuo. Trituration of the residue with several portions of an acetone-ether mixture yields the desired 2,2'-[3-(7-benz[c]acridinylamino)propylimino]diethanol), bis - (N-glycolyl-p-arsanilic acid) salt, of formula

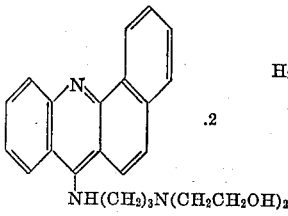 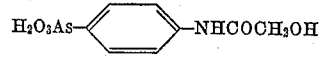

as yellow crystals.

*Example 4*

(a) A mixture of 52.6 g. of 7-chlorobenz[c]acridine and 160 g. of phenol is heated to 50° C. on the steam bath with mechanical stirring. To this melt is then added 32 g. of 2-[(3-aminopropyl)ethylamino]ethanol and the mixture is stirred and heated at 110° C. for two hours. Upon cooling, the reaction mixture is poured into a stirred solution of 50 ml. of concentrated hydrochloric acid in 625 ml. of acetone. The yellow product is collected by filtration, dried and recrystallized from isopropanol. This product is the desired 2-[3-(7-benz[c]acridinylamino)propyl]ethylamino ethanol, dihydrochloride, of formula

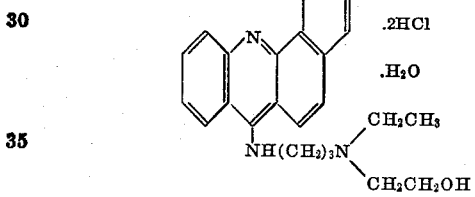

containing one mole of water. The yellow powder melts at 223–225° C. (dec.).

(b) A mixture of 3.7 g. of 7-(3-bromopropylamino)-benz[c]acridine, 1.5 g. of 2-(ethylamino)ethanol and 10 ml. of n-pentanol is heated with mechanical stirring on the steam bath for sixteen hours. The solvent is removed in vacuo; a small amount of water is added and the mixture is concentrated in vacuo. The residue is made alkaline by the addition of dilute aqueous sodium hydroxide solution and the alkaline mixture extracted with chloroform. The combined chloroform extracts are washed thoroughly with water, dried over anhydrous potassium carbonate and filtered. The dry chloroform extracts are diluted with anhydrous ether and an excess of dry hydrogen chloride is bubbled into the mixture. The desired product, 2-{[3-(7-benz[c]acridinylamino)-propyl]ethylamino}ethanol, dihydrochloride, separates and is purified by crystallization from isopropanol; M.P. 224–225° C. (dec.).

The starting material, 7-(3-bromopropylamino)benz[c]acridine, is prepared in the following manner: a mixture of 105.6 g. of 7-chlorobenz[c]acridine and 500 g. of phenol is stirred and heated for fifteen minutes, 32 g. of 3-aminopropanol is added and stirring and heating continued for three hours. Upon cooling the reaction mixture is made alkaline with aqueous alkali, extracted with chloroform, washed with water and dried. The reaction product, 7 - (3 - hydroxypropylamino)benz[c]-acridine, is isolated by removing the drying agent and chloroform and recrystallizing from ethanol; M.P. 111–113° C. 82 g. of the product is mixed with 180 ml. of redistilled constant-boiling hydrobromic acid and 60 ml. of sulfuric acid and heated under gentle reflux for one-half hour. The reaction mixture is quenched in ice-water and made basic with aqueous ammonia. The resulting insoluble mass is induced to crystallize by scratching and the crystalline product, 7-(3-bromopropylamino)-benz[c]acridine, is isolated by filtration, dried, decolorized, and recrystallized from methanol; M.P. 200–202° C.

2-[(3-aminopropyl)ethylamino]ethanol, employed as a starting material in procedure (a), can be prepared from 2-ethylaminoethanol, acrylonitrile and hydrogen in accordance with the method set forth under Example 1 herein for the preparation of 2-[(3-aminopropyl)pentylamino]ethanol.

*Example 5*

A solution of 9.4 g. of 2-{[3-(7-benz[c]acridinylamino)propyl]ethylamino ethanol, dihydrochloride, monohydrate (M.P. 223–225° C.) in 100 ml. of warm water is slowly added with vigorous mechanical stirring to a warm solution of 11.8 g. (0.04 mole) of N-acetyl-4-hydroxy-m-arsanilic acid, monosodium salt, in 400 ml. of water. Upon cooling, a yellow salt precipitates, and is collected by filtration, washed with water, and dried in vacuo. This is the desired 2-{[3-(7-benz[c]acridinylamino)propyl]ethylamino}ethanol, bis - (N - acetyl - 4-hydroxy-m-arsanilic acid) salt, of formula

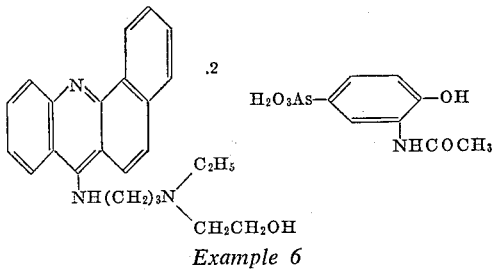

*Example 6*

A mixture of 29.8 g. of 7,10-dichlorobenz[c]acridine and 130 g. of phenol is stirred and heated on the steam bath for fifteen minutes. 1-(3-aminopropyl)-4-piperidinol (18 g.) is then added, and the mixture is heated on a steam bath with stirring for three hours. The cooled reaction mixture is poured with stirring into a solution of 30 ml. of concentrated hydrochloric acid in 600 ml. of acetone, and the resulting mixture diluted with acetone and ether. The yellow benz[c]acridine which separates is collected by filtration, washed with acetone and dried in vacuo. Crystallization of the crude product from a methanol-ethyl acetate mixture gives the desired 1-[3-(10-chloro-7-benz[c]acridinylamino)propyl]-4-piperidinol, dihydrochloride, of formula

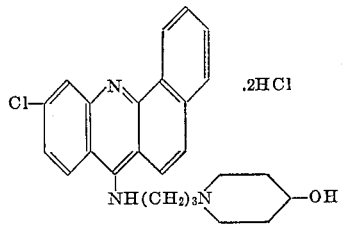

as a bright yellow powder.

1-(3-aminopropyl)-4-piperidinol, employed as a starting material for the above procedure, can be prepared from 4-piperidinol and acrylonitrile in accordance with the method set forth under Example 1 herein for the preparation of 2-[(3-aminopropyl)pentylamino]ethanol.

*Example 7*

A mixture of 52.6 g. of 7-chlorobenz[c]acridine and 160 g. of phenol is heated to 50° C. on a steam bath with mechanical stirring; 33.2 g. of 2-[(5-aminopentyl)ethylamino]-ethanol is added and the mixture is stirred and heated at 110° C. for two hours. Upon cooling, the reaction mixture is poured slowly into a solution of 350 g. of potassium hydroxide in 2 liters of water. The resulting viscous oil is separated from the alkaline solution and extracted with ether. The ether extract is washed with water and dried over potassium carbonate. After twenty-four hours, the drying agent is removed by filtration and the ether filtrate is mixed with an ether solution containing 26.2 g. of salicylic acid. The oil which separates is caused to solidify by chilling and scratching. The crude product is collected by filtration, washed with acetone, dried in air and recrystallized from ethanol. The desired product thus obtained, 2-{[5-(7-benz[c]acridinylamino)pentyl]ethylamino}ethanol, disalicylate, has the formula

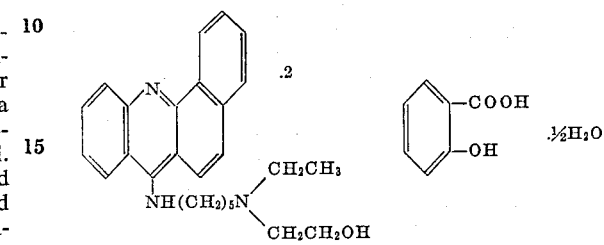

crystallizes as the hemihydrate, M.P. 132–135° C. (dec.).

2-[(5-aminopentyl)ethylamino]ethanol, employed as a starting material for the above procedure, can be prepared as follows: a mixture of 480 g. of 2-ethylaminoethanol, 220 g. of N-(5-bromopentyl)phthalimide and 2 liters of xylene is boiled under reflux for eighteen hours. Upon cooling, one mole of potassium carbonate is added with stirring, and the xylene and excess amine are removed in vacuo. The residue is extracted with methylene chloride; exaporation of the methylene chloride in vacuo leaves the crude N-{5-[ethyl(2-hydroxyethyl)amino]pentyl}phthalimide as a viscous oil.

The crude phthalimide is hydrolyzed by refluxing the crude material with 400 ml. of 20 percent hydrochloric acid for four hours. Upon cooling the mixture, phthalic acid separates and is collected by filtration. Neutralization of the filtrate with a saturated potassium hydroxide solution at 10° C. causes the free amine to separate as a yellow oil. The oil is separated from the alkaline solution, and is repeatedly dried over solid potassium hydroxide. Distillation of the oil in vacuo gives the desired 2-[(5-aminopentyl)ethylamino]ethanol as a colorless liquid, B.P. 103–105° C./1.5 mm., $n_D^{25}$ 1.4870.

*Example 8*

A mixture of 2.78 g. of 7-chloro-10-methylbenz[c]-acridine and 5 g. of phenol is stirred and heated on the steam bath for three hours, cooled, and poured into a stirred mixture of 5 ml. of concentrated hydrochloric acid and 60 ml. of acetone. Upon scratching, the oil which separates solidifies, and is collected by filtration. Recrystallization from an ethanol-ether mixture yields the desired 2-{[3-(10-methyl-7-benz[c]acridinylamino)propyl]ethylamino}ethanol, dihydrochloride, of formula

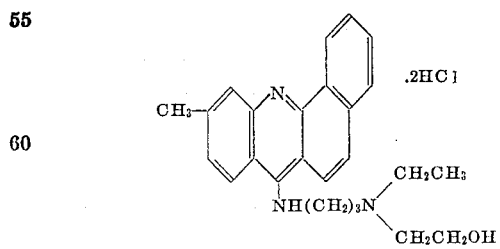

7-chloro-10-methylbenz[c]acridine, employed as a starting material in the above procedure, can be prepared as follows: a mixture of 3.82 g. of 2-chloro-4-methyl benzoic acid, 18.0 g. of 1-naphthylamine, 4.0 g. of anhydrous potassium carbonate, 0.1 g. of potassium iodide, and 0.5 g. of precipitated copper is stirred and heated at 180° C. for three hours. The contents of the flask are extracted with benzene and water while still warm, and the combined aqueous extracts are filtered and the filtrate acidified and crystallized from a water-ethanol mixture to give colorless needles of the desired 4-methyl-2-(1-naphthylamino)-benzoic acid, M.P. 221–222° C. (dec.).

A mixture of 2.1 g. of 4-methyl-2-(1-naphthylamino)-benzoic acid and 30 ml. of redistilled phosphorus oxychloride is refluxed for two hours. The excess phosphorus oxychloride is removed in vacuo, and the residue is slowly poured into an excess of ice and concentrated ammonium hydroxide solution. The crude product is extracted with benzene, the benzene is removed in vacuo, and the residue crystallized from petroleum ether (B.P. 80–100° C.) to give the desired 7-chloro-10-methylbenz[c]acridine as needles, M.P. 149–150° C.

Example 9

A mixture of 26.3 g. of 7-chlorobenz[c]acridine and 120 g. of phenol is stirred and heated on the steam bath for fifteen minutes; subsequently, 17 g. of 1-(3-aminopropyl)-3-piperidinol is added, and the mixture stirred and heated on the steam bath for three hours. Upon cooling, the reaction mixture is poured with stirring into a solution of 30 ml. of concentrated hydrochloric acid in 500 ml. of acetone. After chilling, the mixture is diluted with acetone and ether, and the precipitated benz[c]acridine is collected by filtration and washed with acetone. Crystallization of the residue from an ethanol-ethyl acetate mixture gives the desired 1-[3-(7-benz[c]acridinylamino)propyl]-3-piperidinol, dihydrochloride, of formula

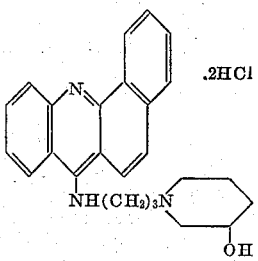

as a yellow powder.

1-(3-aminopropyl)-3-piperidinol, employed as a starting material for the above procedure, can be prepared from 3-piperidinol and acrylonitrile in accordance with the method set forth under Example 1 herein for the preparation of 2-[3-aminopropyl)pentylamino]ethanol.

Example 10

A mixture of 2.9 g. of 7-chloro-2-methoxybenz[c]acridine, 15 g. of phenol and 1.5 g. of 1-(3-aminopropyl)-3-pyrrolidinol and 0.1 g. of cuprous chloride is stirred and heated on the steam bath for three hours. The mixture is cooled, poured into an excess of sodium hydroxide and ice, and the base extracted with chloroform. The combined chloroform extracts are thoroughly washed with 5 percent sodium hydroxide solution and water, and dried over anhydrous potassium carbonate. The drying agent is collected by filtration, the chloroform is evaporated in vacuo, and the residue dissolved in 50 ml. of methanol. This methanol solution is slowly added to a warm solution 9.2 g. of fumagillin in 150 ml. of methanol. The solvent is removed in vacuo, and the desired 1-[3-(2-methoxy-7-benz[c]acridinylamino)propyl] - 3 - pyrrolidinol, bis-fumagillin salt, of formula

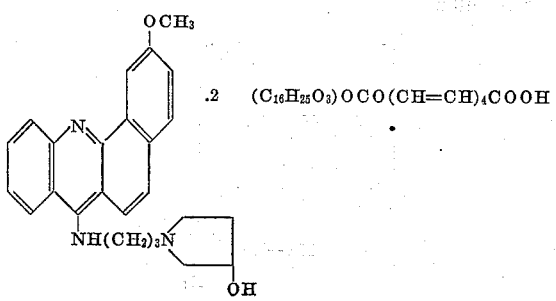

is caused to separate as a bright yellow powder by trituration of the residue with an acetone-ether mixture.

1-(3-aminopropyl)-3-pyrrolidinol, employed as a starting material for the above procedure, can be prepared from 3-pyrrolidinol and acrylonitrile in accordance with the method set forth under Example 1 herein for the preparation of 2-[(3-aminopropyl)pentylamino]ethanol.

Example 11

A mixture of 29.8 g. of 7,10-dichlorobenz[c]acridine and 120 g. of phenol is stirred and heated on the steam bath for fifteen minutes and 20 g. of 2,2'-(4-aminopentylimino)diethanol is subsequently added. After heating for three hours on the steam bath, the mixture is cooled and poured with stirring into a solution of 30 ml. of concentrated hydrochloric acid in 500 ml. of acetone. After chilling, the precipitated benz[c]acridine is collected by filtration and washed with acetone. The product, 2,2'-[4-(10 - chloro - 7 - benz[c]acridinylamino)pentylimino]diethanol, dihydrochloride, of formula

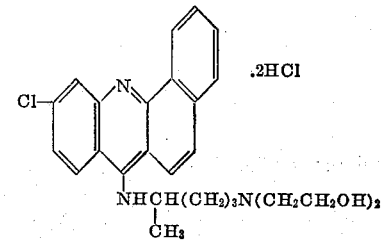

crystallizes from methanol (Darco) as a bright yellow powder.

2,2'-(4-aminopentylimino)diethanol, employed as a starting material for the above procedure, can be prepared as follows: a mixture of 60 g. of 5-chloro-2-pentanone and 105 g. of diethanolamine in 300 ml. of absolute ethanol is refluxed for fifty-two hours. Volatile materials are removed in vacuo, water is added, and the mixture extracted with chloroform. The combined chloroform extracts are dried over potassium carbonate, and the chloroform extracts are dried over potassium carbonate, and the chloroform removed in vacuo to give 66 g. of the crude 5-bis(2-hydroxyethyl)amino-2-pentanone.

The crude aminoketone is added portionwise without further purification to a cold solution of 25 g. of hydroxylamine hydrochloride in 50 ml. of water. The solution is boiled under reflux for one hour, and allowed to stand at room temperature for twenty hours. The mixture is diluted with 70 ml. of water, cooled, saturated with anhydrous potassium carbonate and extracted with chloroform. The combined chloroform extracts are dried over magnesium sulfate, the drying agent collected by filtration, and the chloroform concentrated in vacuo to give 62 g. of the crude 5-bis(2-hydroxyethyl)amino-2-pentanone oxime.

Without further purification, 62 g. of the above oxime is dissolved in 200 ml. of 95% ethanol and hydrogenated at 70° over Raney nickel catalyst at an initial hydrogen pressure of 900 p.s.i.g. The theoretical amount of hydrogen is absorbed in three hours, the catalyst is removed by filtration, and the ethanol removed in vacuo. Distillation of the residue yields the desired 2,2'-(4-aminopentylimino)diethanol as a colorless liquid, B.P. 161–164° C./1.5 mm.

Example 12

(a) A mixture of 26.4 g. of 7-chlorobenz[c]acridine, 20 g. of 2-[(4-aminopentyl)ethylamino]ethanol, and 60 g. of phenol is stirred and heated at 120–130° C. for two hours. Upon cooling, the reaction mixture is stirred into an excess of 20% sodium hydroxide solution, and the product extracted with chloroform. The chloroform extracts are washed with several portions of 10% sodium hydroxide and water, and are treated with decolorizing charcoal. The chloroform solution is evaporated to an oil, which is dissolved in ether. The ether solution is washed with water, and extracted with 10% acetic acid until the extracts give no precipitate with ammonium hydroxide. The acetic extracts are treated with decolorizing charcoal, filtered, made alkaline with 20% sodium hydroxide solution and again extracted with ether; the ether extracts are washed with water and dried over anhydrous potassium carbonate. Upon treatment with excess alcoholic hydrogen chloride, an orange-yellow waxy material precipitates. The crude benz[c]acridine is dissolved in methanol, the solvent evaporated and the residue powdered in a mortar and allowed to dry at room temperature for twenty-four hours. This is the desired 2-{[4-(7-benz[c]acridinylamino)pentyl]ethylamino}ethanol, dihydrochloride, hemihydrate, of formula

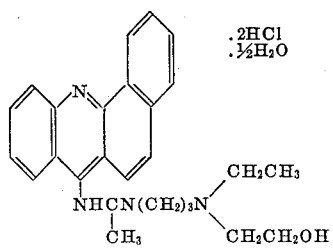

M.P. 135–140° C.

(b) A mixture of 3.4 g. of 7-phenylmercaptobenz[c]acridine and 10 g. of 2-[(4-aminopentyl)ethylamino]ethanol is heated at 120° for eight hours. The mixture is cooled, and poured into a solution of 60 g. of potassium hydroxide in 200 ml. of water. The alkaline mixture is extracted with chloroform, the combined chloroform extracts are washed with water and dried over anhydrous potassium carbonate. The drying agent is collected by filtration, the chloroform solution is diluted with anhydrous ether and dry hydrogen chloride is passed into the mixture. The desired product, 2-{[4-(7-benz[c]acridinylamino)pentyl]ethylamino}ethanol, dihydrochloride, is collected by filtration and purified from methanol; M.P. 134–139° C.

The starting material, 7-phenylmercaptobenz[c]acridine, can be prepared in the following manner: a solution of 11 g. of thiophenol in 50 ml. of absolute ethanol is added slowly to a solution of 2.3 g. of sodium in 100 ml. of absolute ethanol. The resulting mixture is stirred for two hours at room temperature. 26.4 g. of 7-chlorobenz[c]acridine is added and the mixture is heated at reflux temperature for eighteen hours. While hot, the reaction mixture is filtered and the filtrate is treated with decolorizing charcoal. The filtrate is heated to boiling, hot water is added until the solution becomes cloudy and the solution is allowed to cool. The product separates and is collected and purified from an acetone-water mixture.

2-[(4-aminopentyl)ethylamino]ethanol, employed as a starting material for the above procedure, can be prepared as follows: a mixture of 65 g. of 5-chloro-2-pentanone, 98 g. of 2-ethylaminoethanol, 80 g. of sodium chloride, and 280 ml. of xylene is stirred and heated on a steam bath for two hours, then refluxed for three hours. After standing for twenty hours, the mixture is filtered and the precipitate washed with warm xylene and discarded. The xylene is removed from the combined filtrates on the steam bath and the residue distilled in vacuo to give 5-(ethyl, 2-hydroxyethylamino)-2-pentanone, B.P. 96–98° C./mm., $n_D^{25}$ 1.4586.

The above ketone (28 g.) is dissolved in 40 g. of 25% ammoniacal methanol and hydrogenated at 1000 p.s.i.g. in the presence of Raney nickel catalyst. After twelve hours, the catalyst is collected by filtration and the more volatile materials are removed on the steam bath. Distillation of the residue in vacuo gives the desired 2-[(4-aminopentyl)ethylamino]ethanol as a colorless oil, B.P. 101–104° C./1 mm., $n_D^{25}$ 1.4701.

Example 13

A hot, filtered solution of 9.7 g. of 2-{[4-(7-benz[c]acridinylamino)pentyl]ethylamino}ethanol, dihydrochloride, hemihydrate in 100 ml. of water is added slowly with stirring to a hot, filtered solution of 15.5 g. of sodium 8-hydroxy-7-iodo-5-quinolinesulfonate in 500 ml. of water. Upon cooling, the yellow precipitate is collected by filtration and crystallized from an ethanol-acetone mixture to give the desired 2-{[4-(7-benz[c]acridinylamino)pentyl]ethylamino}ethanol, bis-(8-hydroxy-7-iodo-5-quinoline sulfonic acid) salt, of formula

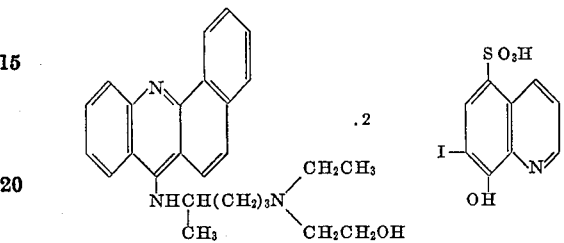

Example 14

A mixture of 26.4 g. of 7-chlorobenz[c]acridine and 130 g. of phenol is stirred and heated on the steam bath for fifteen minutes. Subsequently, 17.2 g. of 1-(3-aminopropyl)-3-piperidinemethanol is added, and the mixture stirred and heated on the steam bath for three hours. The cooled reaction mixture is poured with stirring into a solution of 30 ml. of concentrated hydrochloric acid in 1 liter of acetone, and the resulting mixture diluted with an acetone-ether mixture. The yellow benz[c]acridine which separates is collected by filtration, washed with acetone and dried in vacuo. Crystallization of the yellow product from a methanol-ethyl acetate mixture gives the desired 1-[3-(7-benz[c]acridinylamino)propyl]-3-piperidinemethanol, dihydrochloride, of formula

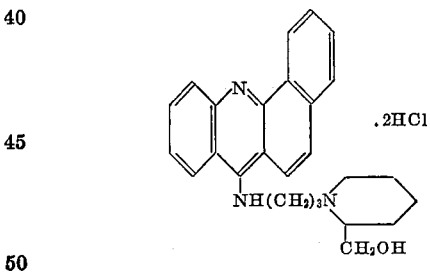

as a bright yellow powder.

1-(3-aminopropyl)-3-piperidinemethanol, employed as a starting material for the above procedure, can be prepared from 3-piperidinemethanol and acrylonitrile in accordance with the method set forth under Example 1 herein for the preparation of 2-[(3-aminopropyl)pentylamino]ethanol.

This application is a continuation-in-part of copending application Serial No. 395,829, filed December 2, 1953.

We claim:

1. A member of the group consisting of a free base and non-toxic acid salts thereof, said free base having the formula

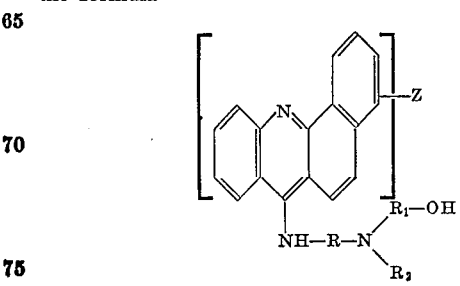

where R is a divalent alkyl radical containing from 2 to 5 carbon atoms inclusive, $R_1$ is a divalent alkyl radical containing from 2 to 8 carbon atoms inclusive, $R_2$ is a member of the class consisting of alkyl and hydroxyalkyl radicals containing from 2 to 8 carbon atoms and, as further members when taken together with —$R_1$—OH and —N<, hydroxy-, hydroxymethyl- and hydroxyethylpyrrolidino and piperidino, and Z is a member of group consisting of hydrogen, lower alkyl, lower alkoxy and halogen radicals.

2. 2,2 - [3-(7-benz[c]acridinylamino)propylimino]diethanol.

3. 2 - {[3-(7-benz[c]acridinylamino)propyl]ethylamino}ethanol.

4. 1 - [3 - (7-benz[c]acridinylamino)propyl]-3-piperidinol.

5. 2,2' - [4-(10-chloro-7-benz[c]acridinylamino)pentylimino]-diethanol.

6. 2 - {[4-(7-benz[c]acridinylamino)pentyl]ethylamino}-ethanol.

References Cited in the file of this patent
UNITED STATES PATENTS
2,773,064     Elslager et al.             Dec. 4, 1956

OTHER REFERENCES

Bachman et al.: J. Org. Chem. (1946), vol. 11, pp. 454–459.

Picha et al.: JACS, vol. 68 (1946), pp 1599–1602.

Wiselogle: Survey of Antimalarial Drugs, vol II, part II, pp. 1380–1381, 1399 and 1344.

Shriner and Fuson: The Systematic Identification of Organic Compounds, N.Y., John Wiley, 1948, 3rd ed., p. 131.